(12) United States Patent
Gordon et al.

(10) Patent No.: US 10,006,601 B2
(45) Date of Patent: Jun. 26, 2018

(54) INTEGRALLY FORMED HEAT SINK AND LAMP HOUSING FOR VEHICLE LAMP ASSEMBLY

(71) Applicant: GM GLOBAL TECHNOLOGY OPERATIONS LLC, Detroit, MI (US)

(72) Inventors: Mark R. Gordon, Warren, MI (US); Larry E. Wainscott, Algonac, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 94 days.

(21) Appl. No.: 15/213,846

(22) Filed: Jul. 19, 2016

(65) Prior Publication Data

US 2018/0023778 A1 Jan. 25, 2018

(51) Int. Cl.
*F21S 41/24* (2018.01)
*F21S 45/47* (2018.01)
*F21V 29/74* (2015.01)
*B60Q 1/00* (2006.01)
*B60Q 1/02* (2006.01)
*F21S 8/10* (2006.01)

(52) U.S. Cl.
CPC ............ *F21S 45/47* (2018.01); *B60Q 1/0088* (2013.01); *B60Q 1/02* (2013.01); *F21S 45/10* (2018.01); *F21S 48/31* (2013.01); *F21S 48/328* (2013.01); *F21V 29/74* (2015.01)

(58) Field of Classification Search
CPC ...... B60Q 1/0011; B60Q 1/0088; B60Q 1/02; F21V 29/74; F21S 48/1241; F21S 48/328; F21S 48/2225–48/2293; F21S 41/24; F21S 43/235–43/251; F21S 45/47
See application file for complete search history.

(56) References Cited

U.S. PATENT DOCUMENTS

| 7,086,765 | B2 | 8/2006 | Wehner | |
|---|---|---|---|---|
| 8,371,732 | B2 | 2/2013 | Charnesky et al. | |
| 8,950,918 | B2 | 2/2015 | Langkabel et al. | |
| 9,291,193 | B2 | 3/2016 | Wainscott et al. | |
| 2004/0070988 | A1* | 4/2004 | Trimpe ................. | F21S 48/155 362/519 |
| 2007/0091632 | A1* | 4/2007 | Glovatsky ............ | B60Q 1/0052 362/547 |
| 2007/0127257 | A1 | 6/2007 | Erion et al. | |

(Continued)

*Primary Examiner* — Anh Mai
*Assistant Examiner* — Steven Horikoshi
(74) *Attorney, Agent, or Firm* — Quinn IP Law

(57) ABSTRACT

Disclosed are vehicle lamp assembly housings, methods for making and for using such housings, and motor vehicles with lamp assemblies employing such housings. A protective lamp housing is disclosed for a motor vehicle lamp assembly. The lamp housing includes a housing body that attaches to the vehicle structure of a motor vehicle. The housing body has an internal chamber that stores therein a light source. The housing body has an open end that attaches to a light-transmissive lens to fluidly isolate the internal chamber. A heat sink with a plurality of convective cooling fins projecting from a thermally conductive main body is integrally formed with the housing body. When joined in this manner, the main body extends into the internal chamber and the cooling fins extend out of the housing body. The heat sink's main body and cooling fins are collectively configured to dissipate heat from the internal chamber.

20 Claims, 2 Drawing Sheets

(56) References Cited

U.S. PATENT DOCUMENTS

| | | | |
|---|---|---|---|
| 2008/0253126 A1* | 10/2008 | Mizutani | B60Q 1/007 362/294 |
| 2011/0242830 A1* | 10/2011 | Okui | F21S 48/115 362/511 |
| 2012/0294028 A1 | 11/2012 | Wainscott et al. | |
| 2012/0307501 A1* | 12/2012 | Tankala | F21K 9/90 362/294 |
| 2014/0293629 A1* | 10/2014 | Otsuji | B62J 6/02 362/475 |
| 2015/0103549 A1* | 4/2015 | Sakashita | F21S 48/1283 362/516 |

\* cited by examiner

INTEGRALLY FORMED HEAT SINK AND LAMP HOUSING FOR VEHICLE LAMP ASSEMBLY

TECHNICAL FIELD

The present disclosure relates generally to lamp assemblies for motor vehicles. More specifically, aspects of this disclosure relate to vehicle headlamps and taillamps with a heat sink for dissipating heat from the lamp housing.

BACKGROUND

Current production motor vehicles, such as the modern-day automobile, are originally equipped with a lighting system to provide interior and exterior illumination for the vehicle operator and passengers. Such lighting systems include an assortment of lamp assemblies that are mounted or otherwise integrated to the front, sides and rear of the vehicle. The purpose of these lamp assemblies is to provide exterior illumination for the driver, for example, to operate the vehicle in low-light conditions, such as nighttime driving, and to increase the conspicuity of the vehicle, such as during inclement weather. Such lighting systems can also display information about the vehicle's presence, position, size, direction of travel, as well as provide signaling functions to indicate the operator's intended maneuvering of the vehicle.

Most conventional automobiles are equipped with taillight assemblies that include directional signal lamps to convey the driver's intent to turn the vehicle, and rear brake lamps to indicate that the vehicle is slowing or stopping. Generally fitted in multiples of two, symmetrically at the left and right edges of the vehicle rear, the brake lamps are red, steady-burning lamps that are illuminated when the driver applies pressure to the brake pedal. Many automobiles are also equipped with a central brake lamp that is mounted higher than the vehicle's traditional left and right brake lamps. The central brake lamp is known as a center high-mounted stop lamp, or "CHMSL" (pronounced chim-zul). The CHMSL is intended to provide a notice of deceleration to following drivers whose view of the vehicle's regular stop lamps is blocked by interceding vehicles.

In addition to the above-mentioned taillight assemblies, current production automobiles are also equipped with front-mounted headlamps. With a similar arrangement to the rear-mounted taillights, an individual headlamp assembly is typically mounted at both the front-left and front-right corners of the vehicle. The headlamp is generally designed to provide forward illumination in two different settings: a "low-beam setting, which provides adequate forward and lateral illumination for normal driving conditions with minimized glare, and a "high-beam" setting, which provides an intense, center-weighted distribution of light that is primarily suitable for driving scenarios where on-coming drivers are not present. Most headlamps are also provided with directional signals (more commonly known as "turn signals" or colloquially as "blinkers").

Conventional taillight and headlight assemblies require numerous internal parts, such as mounting brackets, reflectors, a set of filament-type light bulbs or light emitting diodes (LED), internal adjuster mechanisms, projector lamps and, in some cases, a printed circuit board (PCB) control unit. Some designs require a linear actuator, such as an electric stepping motor and power screw, to selectively reposition the lighting elements and/or reflectors and thereby modify the lamp assembly's working mode (e.g., generate daylight running lamp (DRL) light output, low-beam light output, high-beam light output, etc.). Traditionally, the entire lamp assembly is pre-assembled into a protective lamp housing prior to integration with the vehicle. A protective outer lens is then used to seal the housing and shield the internal lamp componentry from external debris, weather, and the like. It is also known to hermetically seal the lamp assembly to prevent the unwanted ingress of moisture and other contaminants.

The use of high-intensity, high-luminosity lighting elements within these enclosed lamp fixtures tends to generate large amounts of heat, especially during prolonged continuous use. To dissipate heat generated by the lighting elements when the lamp fixture is in operation, one or more heat sinks have been mounted inside the protective lamp housing. Current production heat sinks, however, require dedicated parts and packaging space for mounting to the lamp housing interior, which in turn increases the cost, weight and size of the lamp assembly. Many of these lamp fixture designs also require a fan be coupled to the lamp housing for convectively cooling the heat sink. In addition to increasing part and assembly costs, a supplemental cooling fan of sufficient size to cool the heat sink also requires additional packaging space within the housing, which increases the overall mass and footprint of the lamp assembly.

SUMMARY

Disclosed herein are vehicle lamp assembly housings with integrally formed heat sinks, methods for making and using such lamp housings, and motor vehicles with a lamp assembly including a lamp housing with an integrally formed heat sink. By way of example, and not limitation, a novel protective lamp housing with a convective heat sink integrally molded to the exterior of the housing is disclosed. Both the housing and heat sink can be fabricated from thermoplastic polymers such that the two can be integrally formed, e.g., via two-shot plastic injection molding, as a single unit. The resultant coupling interface between the two components may comprise a tabled splice joint. It may be desirable that the heat sink be formed from a light-weight thermally conductive plastic, such as liquid crystal polymers, while the remainder of the housing is formed from a crack-resistant and heat-resistant polymer, such as high-impact polypropylene (HIPP). When properly united, the heat sink cooling fins project transversely from a side of the lamp housing, partially recessed into a complementary pocket, while the heat sink's main body projects into the housing and thermally couples with the lighting element(s). One or more flow channels may be formed along the exterior of the housing to ensure that cooling air is directed over and around the fins.

Attendant benefits for at least some of the disclosed concepts include the elimination of mounting brackets, seals, and related parts for attaching a heat sink inside the lamp housing, which in turn reduces part and manufacturing costs. By forming the heat sink to the outside of the housing, dedicated internal packaging space is minimized such that the lamp housing can be made smaller, leading to further reduced assembly weight and material costs. Also, when compared to conventional metallic fin designs, molded plastic fins decrease part weight and materials costs, allow for increased 3-D shape complexity, improved corrosion resistance, and eliminate the need for protective coatings. In addition, the need for a cooling fan to inject air into the lamp housing is eliminated, which again leads to reduced part and assembly costs as well as reduced packaging space and assembly weight.

Aspects of the present disclosure are directed to integrally formed heat sink and lamp housings for motor vehicle lamp assemblies, which may be in the nature of headlights, taillights, fog lights, CHMSL's, etc. Disclosed, for example, is a protective lamp housing for a vehicle lamp assembly of a motor vehicle. The vehicle lamp assembly includes a transparent or generally transparent light-transmissive lens, and a light source (e.g., filament bulb, LED array, SSL, etc.) that generates light. The protective lamp housing includes a housing body that is configured to attach to the vehicle structure of the motor vehicle (e.g., within a lamp well above the front or rear bumper). The housing body defines an internal chamber configured to store therein the light source. An open end of the housing body is configured to attach to the lens and thereby fluidly isolate the internal chamber. A heat sink with multiple convective cooling fins projecting from a thermally conductive main body is integrally formed with the housing body. When united, the heat sink's main body extends into the internal chamber of the housing body while the convective cooling fins extend out of the housing body, e.g., projecting transversely from an exterior surface. The heat sink's main body and cooling fins are collectively configured to dissipate heat from the internal chamber.

Other aspects of the present disclosure are directed to motor vehicles employing lamp assemblies with an integrally formed heat sink and lamp housing. A "motor vehicle," as used herein, may include any relevant vehicle platform, such as passenger vehicles (internal combustion engine (ICE), hybrid, electric, fuel cell, etc.), commercial vehicles, industrial vehicles, all-terrain vehicles (ATV), farm equipment, motorcycles, boats, airplanes, etc. In one example, a motor vehicle is disclosed that includes a vehicle body with front-end and rear-end vehicle structure. A lamp assembly with a lamp housing is mounted to the front-end or rear-end of the vehicle structure. The lamp housing body defines an internal chamber and an open end faced away from the vehicle body.

The lamp assembly also includes a light-transmissive lens that is attached to the lamp housing; the lens covers the open end of the housing body and fluidly isolates the internal chamber. A light-generating light source, which may comprise an LED array coupled to a light pipe, is mounted inside the internal chamber of the lamp housing. A heat sink with convective cooling fins projecting from a thermally conductive main body is integrally formed with the housing body. The heat sink's main body extends into the internal chamber of the lamp housing, whereas the convective cooling fins extend transversely from an exterior surface of the housing body. The heat sink's main body and cooling fins are collectively configured to dissipate heat from the internal chamber.

According to other aspects of the present disclosure, methods of making and methods of using integrally formed heat sink and lamp housings are presented. For instance, a method is disclosed for constructing a protective lamp housing for a vehicle lamp assembly of a motor vehicle. The method includes: first-shot injection molding a housing body that is configured to attach to the motor vehicle's vehicle structure, the housing body being formed with an internal chamber for storing therein a light source, and with an open end for attaching to a light-transmissive lens and thereby fluidly isolate the internal chamber; and second-shot injection molding a heat sink with the housing body, the heat sink being formed with a thermally conductive main body and a plurality of convective cooling fins projecting from the main body, the heat sink being molded to the housing body such that the main body extends into the internal chamber and the cooling fins extend out of the housing body. The main body and cooling fins are collectively configured to dissipate heat from the internal chamber.

The above summary is not intended to represent every embodiment or every aspect of the present disclosure. Rather, the foregoing summary merely provides an exemplification of some of the novel aspects and features set forth herein. The above features and advantages, and other features and advantages of the present disclosure, will be readily apparent from the following detailed description of representative embodiments and modes for carrying out the present disclosure when taken in connection with the accompanying drawings and the appended claims.

Figure 1:
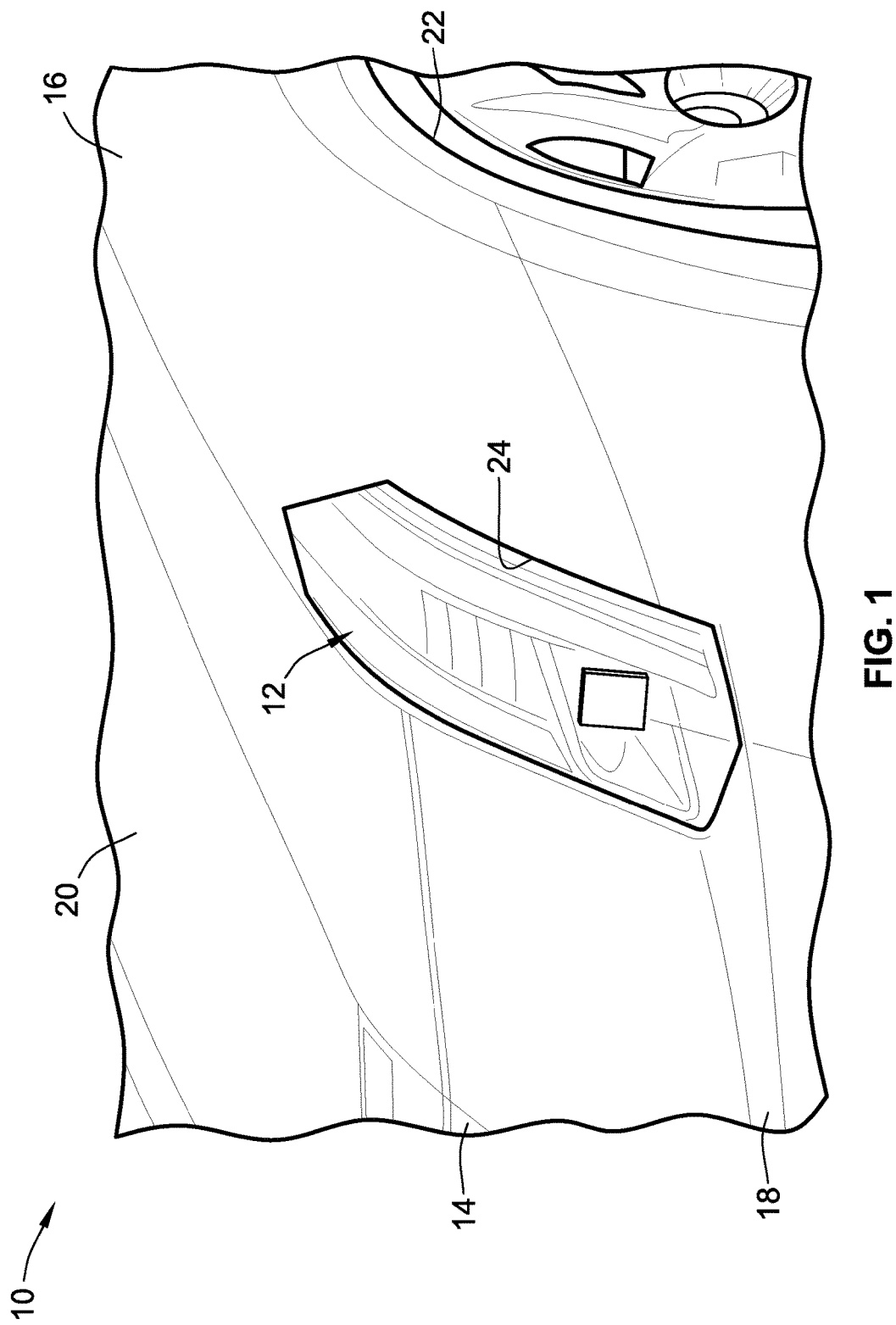
FIG. 1 is a front perspective-view illustration of a portion of a representative motor vehicle with a vehicle lamp assembly in accordance with aspects of the present disclosure.

The present disclosure is susceptible to various modifications and alternative forms, and some representative embodiments have been shown by way of example in the drawings and will be described in detail herein. It should be understood, however, that the novel aspects of this disclosure are not limited to the particular forms disclosed. Rather, the disclosure is to cover all modifications, equivalents, combinations, subcombinations, and alternatives falling within the spirit and scope of the disclosure as defined by the appended claims.

DETAILED DESCRIPTION OF THE ILLUSTRATED EMBODIMENTS

This disclosure is susceptible of embodiment in many different forms. There are shown in the drawings and will herein be described in detail representative embodiments of the disclosure with the understanding that the present disclosure is to be considered as an exemplification of the principles of the disclosure and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference or otherwise. For purposes of the present detailed description, unless specifically disclaimed: the singular includes the plural and vice versa; the words "and" and "or" shall be both conjunctive and disjunctive; the word "all" means "any and all"; the word "any" means "any and all"; and the words "including" and "comprising" and "having" mean "including without limitation." Moreover, words of approximation, such as "about," "almost," "substantially," "approximately," and the like, can be used herein in the sense of "at, near, or nearly at," or "within 3-5% of," or "within acceptable manufacturing tolerances," or any logical combination thereof, for example.

Referring now to the drawings, wherein like reference numbers refer to like features throughout the several views, there is shown in FIG. 1 a front-view illustration of a representative automobile, designated generally at 10, in accordance with aspects of the present disclosure. Mounted at a forward portion of the automobile 10, in between the automobile's front grille 14 and a front fender panel 16, is a vehicle lamp assembly 12. The automobile 10—also referred to herein as "motor vehicle" or "vehicle" for short—is merely an exemplary application with which the inventive aspects of this disclosure can be practiced. In the same vein, the implementation of the present concepts into a headlight assembly should also be appreciated as an exemplary application of the inventive concepts disclosed herein. As such, it should be understood that the inventive features of the present disclosure can be integrated into other vehicle lamp assemblies and utilized for any type of motor vehicle. Lastly, the drawings presented herein, are not necessarily to scale and are provided purely for instructional purposes. Thus, the specific and relative dimensions shown in the drawings are not to be construed as limiting.

FIG. 1 is illustrative of the automobile's 10 vehicle body, which can be divided for purposes of this description into front vehicle structure that is adjacent to and forward of rear vehicle structure (not visible in the view provided). The front vehicle structure is represented herein by the front grille 14, the fender panel 16, a front bumper fascia 18 and a movable hood assembly 20. Front bumper fascia 18 extends transversely across the forward most portion of the vehicle 10 to cover and conceal, among other things, an energy absorbing bumper substructure (not visible). The bumper fascia 18 is forward of a movable hood assembly 20 that spans over and covers the automobile's 10 forward engine compartment (not visible). The front bumper fascia 18 cooperates with right-hand front fender panel 16 to partially define the peripheral contour of a front-right wheel well, which is designated generally at 22. The bumper fascia 18 also cooperates with the front fender panel 16 and hood assembly 20 to partially define a front-right lamp well, identified at 24 in FIG. 1. Packaged within the lamp well 24 is a corresponding vehicle lamp assembly 12 (only the right-hand assembly is evident in FIG. 1, but a mirror-image, left-hand counterpart is also present in this particular embodiment).

Figure 2:
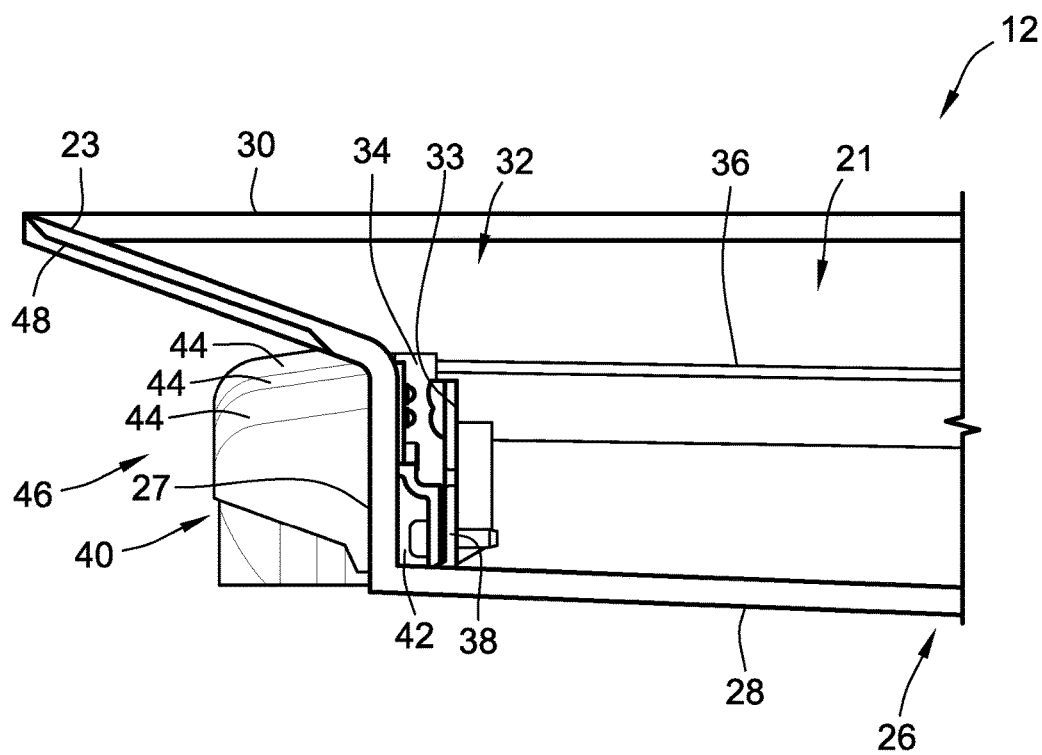
FIG. 2 is a cross-sectional plan-view illustration of a portion of the representative vehicle lamp assembly of FIG. 1 showing an integrally formed heat sink and lamp housing in accordance with aspects of the present disclosure.

Turning to FIG. 2, a portion of the vehicle lamp assembly 12 is shown in cross-section to better illustrate an integrally formed lamp housing and heat sink, designated generally at 26, in accordance with aspects of the present disclosure. The protective lamp housing 26 includes a rigid housing body 28 with an internal chamber 21 that is accessible through an open front end 23. A transparent or semi-transparent protective outer lens 30 is mounted to a forward end of the lamp housing 26, extending across and covering the open end 23 thereof to fluidly isolate the internal chamber 21. The lamp housing body 28, which can be made of a hydroformed or injection molded plastic material, such as high-impact polypropylene (HIPP), is designed to fit within the lamp well 28. The housing body 28 is fabricated with a plurality of attachments (e.g., snap fasteners, mounting tabs, threaded bolt cavities, etc.) by which the lamp assembly 12 is mounted to this vehicle structure. The outer lens 30, which serves as a protective barrier from the outside environment while still allowing light to pass out of the assembly 12, may be comprised of light-transmissive materials, such as polycarbonate or acrylic. To prevent unwanted corrosion and fogging, the lens 30 may be coated with an abrasion-resistant, UV-reflective hardcoat.

A forward-illuminating lighting arrangement, designated generally as 32, is encased within the internal chamber 21, located between the lamp housing body 28 and protective lens 30. With reference to FIG. 2, the lighting arrangement 32 is provided with a light-emitting diode (LED) array 34 (also referred to herein as "light source" 34) that is optically coupled to a light pipe 36 for transporting and emitting light generated by the LED array 34. Recognizably, the light source 34 may take on various configurations, including halogen bulb, gas-discharge element, or incandescent lamp, as some non-limiting examples. In the representative embodiment of FIG. 2, the light source 34 is a high-intensity, high-luminosity LED module with a daylight white or RGB array of LEDs mounted to an LED printed circuit board (PCB) (not visible in the view provided). Other optional componentry for the vehicle lamp assembly 12 may include a high-beam/low-beam lamp, an optical diffuser, color or polarizing optical filters, bezels, etc.

A longitudinal end of light pipe 36 (also known in the art as "optical waveguide") is seated against a light-focusing optical coupler (not visible) adjacent the LED array 34 via a mounting bezel 38. The light pipe 36 captures some or all of the light generated by the LED module 34, and transports the light along the longitudinal expanse of the light pipe's body from a first (proximal) face 33 toward a second (distal) face (not visible in FIG. 2; located at the opposite end of the light pipe). The light pipe 36 is fabricated from a material, e.g., a dielectric material with high permittivity and, thus, a high index of refraction, that can transmit light generated by the LEDs to preselected locations along the forward vehicle structure (FIG. 1), and diffuse the light, e.g., via successive internal reflection, in preselected amounts and predetermined directions across the length of the light pipe's body. Such materials may include, but are certainly not limited to, polycarbonate (PC), polymethyl methacrylate (PMMA), polyethylene terephthalate (PET), acrylic, glass, and combinations thereof. In an alternative embodiment, a reflector system may be integrated into the lamp assembly where a backside wall of a reflector is seated against the LED and heat sink to allow for dissipation of heat from the lamp assembly.

To dissipate heat from the lamp housing body 28, including heat generated by the light source 34 when the lamp assembly 12 is in operation, a passive (non-active) convective heat sink 40 is integrally formed with the housing body 28. As shown, the heat sink 40 is formed as a single-piece, unitary structure from a light-weight thermally conductive plastic, such as a resin-based liquid crystal polymer matrix. A series of convective cooling fins 44 is arranged with the fins 44 parallel to each other and projecting generally orthogonally from a thermally conductive main body 42. The housing body 28 and heat sink 40 are united, e.g., via two-shot plastic injection molding, such that the main body 42 extends into the internal chamber 21 while the convective cooling fins 44 extend transversely from an outer surface of the housing body 28. It may be desirable, for at least some embodiments, that the heat sink 40 be integrally formed into a top-most outer wall of the housing body 28 to optimize the thermal dissipation of rising heat. According to the illustrated example, the housing body 28 includes a stepped region, which is recessed inward from the outermost edge (e.g., adjacent the open end 23 in FIG. 2) that forms a complementary pocket 46; the cooling fins 44 of the heat sink 40 are partially seated in this complementary pocket 46.

One or more optional flow channels 48 designed to direct air to the cooling fins 44 can be formed into an exterior surface of the housing body 28.

The integrally formed heat sink 40, namely main body 42 and cooling fins 44, acts as a passive heat exchanger that dissipates heat from the internal chamber 21 of the housing body 28 into a moving coolant fluid. By way of example, and not limitation, the heat sink 40 may be formed from a polymeric material with a thermal conductivity (Lambda), measured in watts per meter-Kelvin (W/mK), of about 10 W/mK to about 90 W/mK or, in some embodiments, about 20 W/mK to about 40 W/mK. In so doing, the heat sink main body 42, which is coupled to the LED array 34 via a mounting bezel 38, thermally conducts heat out of the internal chamber 21 to the cooling fins 44. The cooling fins 44, in turn, dissipate this heat through thermal convection to passing ambient air. In some embodiments, the convective cooling fins 44 exhibit a thermal resistance (in$^{2\circ}$ C./W) of approximately 0.07 to approximately 0.57.

Figure 3:
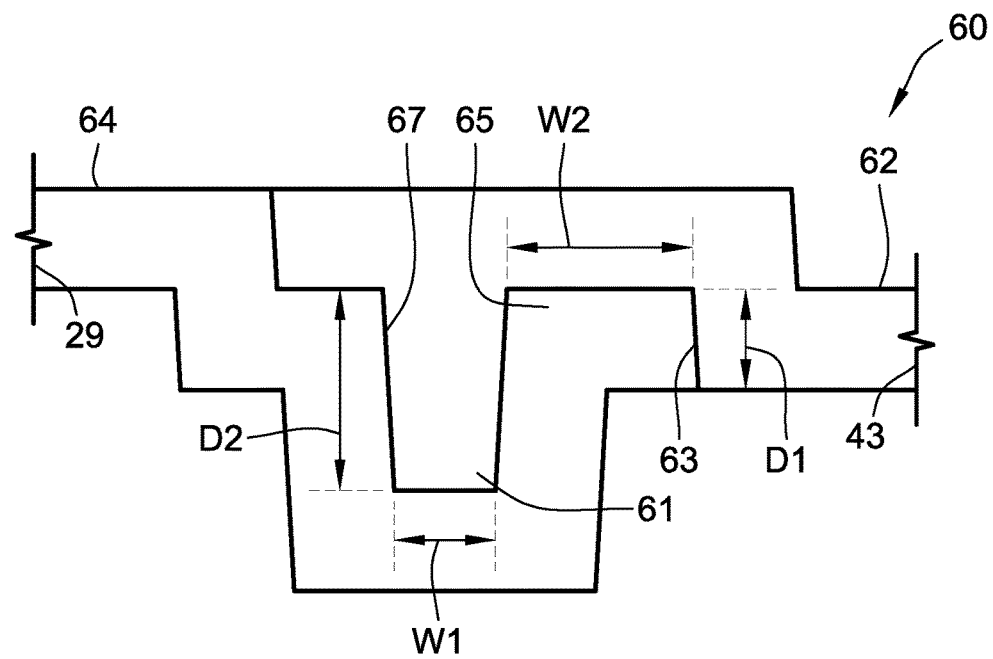
FIG. 3 is a cross-sectional illustration of a portion of the integrally formed heat sink and lamp housing of FIG. 2 showing a tabled splice joint formed from two-shot injection molding in accordance with aspects of the present disclosure.

The main body 42 of the heat sink 40 can be molded to an exterior surface 27 of the housing body 28 such that the heat sink 40 and housing body 28 unite at a coupling joint 60, an example of which is shown in FIG. 3. For some configurations, this coupling joint 60 extends continuously or substantially continuously around the outer perimeter of the heat sink's main body 42. The resultant coupling interface between the two components may comprise a tabled splice joint. In particular, the coupling joint 60 of FIG. 3 is composed of first and second joining flanges 62 and 64, respectively, with one of the joining flanges projecting from the housing body 28 and the other joining flange projecting from the heat sink 40. For instance, the first joining flange 62 can project from an outer perimeter surface 43 of the heat sink's main body 42, while the second joining flange 64 can project inward from a cavity 29 in the exterior surface 27 of the housing body 28. It should be readily apparent that alternative configurations can be designed with the first joining flange 62 projecting from the housing body 28 and the second joining flange 64 projecting from the heat sink's main body 42. Additionally, while the two joining flanges 62, 64 are shown in the drawings with differing shapes and sizes, it is envisioned that the joining flanges 62, 64 be generally geometrically identical.

The rigid joining flanges 62, 64 are married together in a meshing relationship to unite the housing body 28 and the main body 42. Formed at a distal end of the first joining flange 62 are a first elongated rail 61 and a first recessed slot 63. Likewise, formed at a distal end of the second joining flange 64 are a second elongated rail 65 and a second recessed slot 67. As shown, the first rail 61 is seated flush within the second slot 67 of the second joining flange 64, while the second rail 65 is seated flush within the first slot 63 of the first joining flange 62 to thereby interlock the first and second joining flanges 62, 64. To provide a more secure interlocking engagement, the first slot 63 has a first depth D1 that is smaller than a second depth D2 of the second slot 67. As another option, the first rail 61 can be fabricated with a first width W1 while the second rail 65 can be fabricated with a second width W2 that is wider than the first width W1. Optional configurations may use adhesives, threaded fasteners, heat steaks, rivets and the like to rigidly secure the joint 60 between the housing body 28 and heat sink main body 42.

While aspects of the present disclosure have been described in detail with reference to the illustrated embodiments, those skilled in the art will recognize that many changes may be made thereto without departing from the scope of the present disclosure. The present disclosure is not limited to the precise construction and compositions disclosed herein; any and all modifications, changes, and variations apparent from the foregoing descriptions are within the spirit and scope of the disclosure as defined in the appended claims. Moreover, the present concepts expressly include any and all combinations and subcombinations of the preceding elements and features.

What is claimed:

1. A protective lamp housing for a vehicle lamp assembly of a motor vehicle having vehicle structure, the vehicle lamp assembly including a transparent or generally transparent lens and a light source configured to generate light, the protective lamp housing comprising:
    a housing body configured to attach to the vehicle structure of the motor vehicle, the housing body defining an internal chamber configured to store therein the light source, the housing body having an open end configured to attach to the lens and thereby fluidly isolate the internal chamber; and
    a heat sink with a thermally conductive main body and a plurality of convective cooling fins projecting from the main body, the heat sink being integrally formed with the housing body such that the main body extends into the internal chamber and the plurality of cooling fins extend out of the housing body, the main body and cooling fins being collectively configured to dissipate heat from the internal chamber,
    wherein the main body of the heat sink is affixed to the housing body via a coupling joint, the coupling joint including first and second joining flanges, the first joining flange projecting from the main body and including a first rail and slot, and the second joining flange projecting from the housing body and including a second rail and slot, the first rail being seated in the second slot and the second rail being seated in the first slot to thereby interlock the first and second joining flanges, and
    wherein the first slot has a first depth that is smaller than a second depth of the second slot, and/or the first rail has a first width that is less than a second width of the second rail.

2. The protective lamp housing of claim 1, wherein the main body of the heat sink is molded onto an exterior surface of the housing body.

3. The protective lamp housing of claim 1, wherein the coupling joint extends continuously or substantially continuously around an outer perimeter of the main body.

4. The protective lamp housing of claim 2, wherein the first joining flange projects from an outer perimeter of the main body, and the second joining flange projects inward from a cavity in the exterior surface of the housing body.

5. The protective lamp housing of claim 1, wherein the first slot has the first depth that is smaller than the second depth of the second slot.

6. The protective lamp housing of claim 1, wherein the first rail has the first width that is less than the second width of the second rail.

7. The protective lamp housing of claim 1, wherein the housing body has an exterior surface with a stepped region defining a complementary pocket, the cooling fins of the heat sink being at least partially seated in the complementary pocket.

8. The protective lamp housing of claim 1, wherein the main body of the heat sink is configured to thermally couple to the light source.

9. The protective lamp housing of claim 1, further comprising a bezel configured to support thereon the light source and an optical light pipe.

10. The protective lamp housing of claim 1, wherein the housing body includes an exterior surface with one or more flow channels configured to direct air to the cooling fins.

11. The protective lamp housing of claim 1, wherein the housing body is formed from a first moldable thermoplastic polymer and the heat sink is formed from a second moldable thermoplastic polymer distinct from the first moldable thermoplastic polymer.

12. The protective lamp housing of claim 1, characterized by a lack of mounting brackets and mounting screws for attaching the heat sink to the housing body.

13. A motor vehicle, comprising:
a vehicle body having opposing front-end and rear-end vehicle structure; and
a lamp assembly comprising:
a lamp housing with a housing body mounted to the front-end vehicle structure or the rear-end vehicle structure, the housing body defining an internal chamber and an open end facing away from the vehicle body;
a light-transmissive lens attached to the lamp housing and covering the open end of the housing body to thereby fluidly isolate the internal chamber;
a light source mounted inside the internal chamber of the lamp housing and configured to generate light; and
a heat sink with a thermally conductive main body and a plurality of convective cooling fins projecting from the main body, the heat sink being integrally formed with the housing body such that the main body extends into the internal chamber and the convective cooling fins extend transversely from an exterior surface of the housing body, the main body and cooling fins being collectively configured to dissipate heat from the internal chamber,
wherein the main body is affixed to the housing body via a coupling joint that includes first and second joining flanges, the first joining flange projecting from the main body and including a first rail and a first slot, and the second joining flange projecting from the housing body and including a second rail and a second slot, the first rail being seated in the second slot and the second rail being seated in the first slot to thereby interlock the first and second joining flanges, and wherein the first slot has a first depth that is smaller than a second depth of the second slot, and/or the first rail has a first width that is less than a second width of the second rail.

14. A method of constructing a protective lamp housing for a vehicle lamp assembly of a motor vehicle having vehicle structure, the vehicle lamp assembly including a transparent or generally transparent lens and a light source configured to generate light, the method comprising:
first-shot injection molding a housing body configured to attach to the vehicle structure of the motor vehicle, the housing body being formed with an internal chamber configured to store therein the light source, and with an open end configured to attach to the lens and thereby fluidly isolate the internal chamber; and
second-shot injection molding a heat sink with the housing body, the heat sink being formed with a thermally conductive main body and a plurality of convective cooling fins projecting from the main body, the heat sink being molded to the housing body such that the main body extends into the internal chamber and the plurality of cooling fins extend out of the housing body, the main body and cooling fins being collectively configured to dissipate heat from the internal chamber,
wherein the main body of the heat sink is affixed to the housing body via a coupling joint that includes first and second joining flanges, the first joining flange projecting from the main body and including a first rail and slot, and the second joining flange projecting from the housing body and including a second rail and slot, the first rail being seated in the second slot and the second rail being seated in the first slot to thereby interlock the first and second joining flanges, and wherein the first slot has a first depth that is smaller than a second depth of the second slot, and/or the first rail has a first width that is less than a second width of the second rail.

15. The method of claim 14, wherein the main body of the heat sink is molded to an exterior surface of the housing body.

16. The method of claim 14, wherein the coupling joint extends continuously or substantially continuously around an outer perimeter of the main body.

17. The method of claim 15, wherein the first joining flange projects from an outer perimeter of the main body, and the second joining flange projects inward from a cavity in the exterior surface of the housing body.

18. The method of claim 14, wherein the first slot has the first depth that is smaller than the second depth of the second slot, and wherein the first rail has the first width that is less than the second width of the second rail.

19. The method of claim 14, wherein the housing body is formed with an exterior surface with a stepped region defining a complementary pocket, the cooling fins of the heat sink being at least partially seated in the complementary pocket.

20. The method of claim 14, wherein the housing body is injection molded from a first thermoplastic polymer and the heat sink is injection molded from a second thermoplastic polymer distinct from the first thermoplastic polymer.

* * * * *